(12) United States Patent
Niklewicz

(10) Patent No.: US 11,953,038 B2
(45) Date of Patent: Apr. 9, 2024

(54) SMALL FASTENER

(71) Applicant: Kwikbolt Limited, Isleworth (GB)

(72) Inventor: Jan Niklewicz, Kingston Upon Thames (GB)

(73) Assignee: Kwikbolt Limited, Middlesex (GB)

( * ) Notice: Subject to any disclaimer, the term of this patent is extended or adjusted under 35 U.S.C. 154(b) by 125 days.

(21) Appl. No.: 17/765,473

(22) PCT Filed: Oct. 1, 2020

(86) PCT No.: PCT/EP2020/077603
§ 371 (c)(1),
(2) Date: Mar. 31, 2022

(87) PCT Pub. No.: WO2021/064148
PCT Pub. Date: Apr. 8, 2021

(65) Prior Publication Data
US 2022/0373013 A1    Nov. 24, 2022

(30) Foreign Application Priority Data

Oct. 1, 2019 (GB) ...................................... 1914112

(51) Int. Cl.
*F16B 19/10* (2006.01)
*F16B 13/08* (2006.01)

(52) U.S. Cl.
CPC ............ *F16B 19/109* (2013.01); *F16B 13/08* (2013.01)

(58) Field of Classification Search
CPC ..... F16B 13/0808; F16B 19/109; F16B 13/08
(Continued)

(56) References Cited

U.S. PATENT DOCUMENTS 3,946,636 A * 3/1976 Grey .................. F16B 13/0808
411/346
5,865,559 A * 2/1999 Yang ..................... F16B 21/165
403/321
(Continued)

FOREIGN PATENT DOCUMENTS

EP         2247862 A1    11/2010
WO         9635883 A1    11/1996
WO    WO-2017177256 A1 * 10/2017    ............ F16B 5/0642

OTHER PUBLICATIONS

Search report in parent application PCT/EP2020/077603, dated Nov. 20, 2020.

*Primary Examiner* — Sarang Afzali
*Assistant Examiner* — Darrell C Ford
(74) *Attorney, Agent, or Firm* — Schott, P.C.

(57) ABSTRACT

A removable blind fastener includes: a body; a screw member; and a clamping member. The body includes a hollow cylindrical shaft with a proximal end and a distal end and a head at the proximal end, the head being hollow with an internal end face. The shaft has an open guide channel along a portion of its length and an urge channel opposite the guide channel located at the distal end of the shaft. The screw member has a threaded region that fits within the shaft and the screw member has a head at a proximal end that fits within the hollow head. The clamping member fits in the guide channel and has a threaded aperture for engaging with the threaded region of the screw member, such that rotation of the screw member causes the clamping member to move along the guide channel of the body.

11 Claims, 5 Drawing Sheets

(58) Field of Classification Search
USPC .......................................... 411/340, 344–346
See application file for complete search history.

(56) References Cited

U.S. PATENT DOCUMENTS

| | | | |
|---|---|---|---|
| 6,193,261 B1 * | 2/2001 | Hahka | B60D 1/02 |
| | | | 24/453 |
| 7,736,108 B1 * | 6/2010 | Bruce | F16B 13/0808 |
| | | | 411/340 |
| 2014/0154028 A1 * | 6/2014 | Pei | F16B 13/0808 |
| | | | 411/345 |

* cited by examiner

Fig. 3d
Fig. 3e
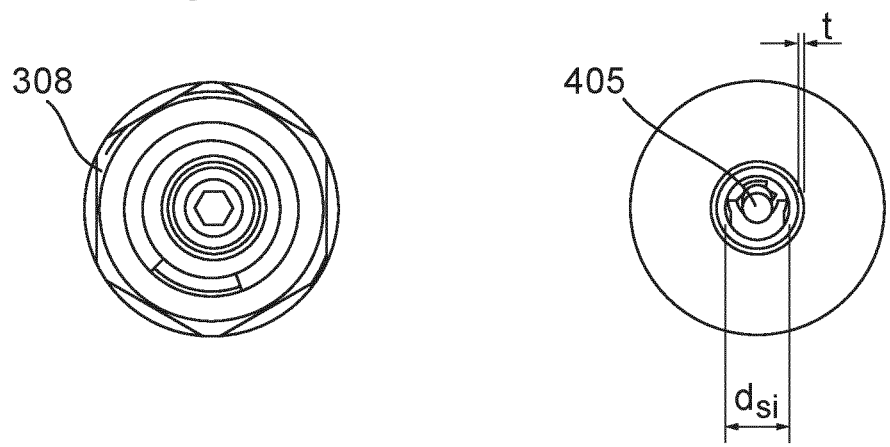
Fig. 4
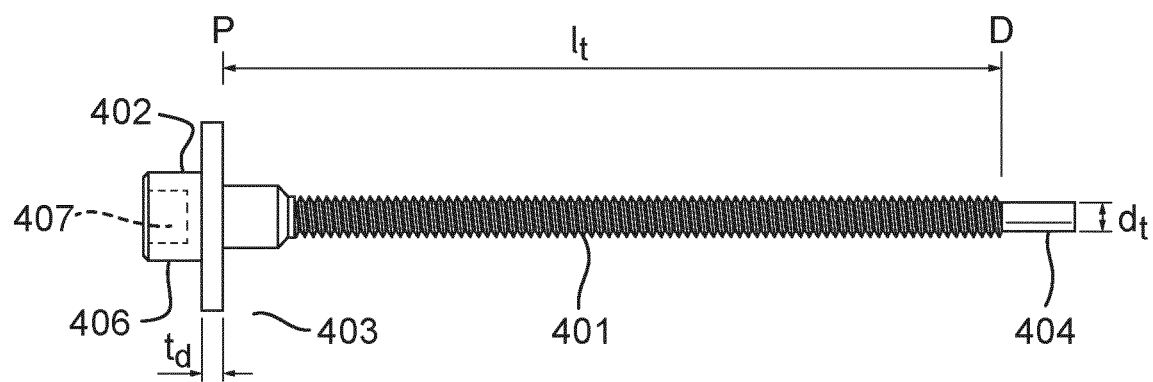

SMALL FASTENER

BACKGROUND

Field of the Invention

The invention is in the field of removable fasteners for use in clamping components together, where the fastener may be inserted into pre-drilled apertures in the components and used in situations where it is not possible to access the reverse of the components. The invention particularly relates to use in clamping components with very narrow pre-drilled apertures.

Description of Related Art

Temporary fasteners are used during the fabrication of complex structures such as aircraft frames to align components before permanent fasteners are installed. Pre-drilled holes in the components are aligned and temporary fasteners inserted to clamp the components while the rest of the holes are drilled and fitted with permanent fasteners. It is convenient for such temporary fasteners to be operated from one side of the work-piece only, i.e. to insert and activate the fastener from above the work-piece without having to hold a part of the fastener from the underside of the work-piece, as would be the case for a nut and bolt, because often it is not possible to access both sides of the pieces being clamped simultaneously. Fasteners that operate from one side are called "blind" fasteners and they typically have a threaded part that carries a set of expandable legs, for example EP2247862B; the legs have protruding heads for applying the clamping load and the legs can be expanded when inserted into an aperture and drawn towards the work-piece by rotation of the threaded part until the desired clamping load is achieved.

Components to be joined can be small and the apertures for the permanent fasteners are very narrow, of the order of 2 mm to 4 mm in diameter. This poses a problem for clamping the components with temporary fasteners because typically their threads and legs are bulky and cannot be conveniently miniaturised without sacrificing performance. It is therefore an object of the present invention to provide a removable blind fastener with a mechanism suitable for use in very narrow apertures.

SUMMARY OF THE INVENTION

In an embodiment, a removable blind fastener is provided comprising, a body, a screw member and a clamping member, wherein the body comprises a hollow cylindrical shaft having a proximal end and a distal end and a head at the proximal end, the head being hollow with an internal end face, wherein the shaft has an open guide channel along a portion of its length and an urge channel opposite the guide channel wherein the urge channel is located at the distal end of the shaft, wherein the screw member has a threaded region that fits within the shaft of the body and wherein the screw member has a head at a proximal end that fits within the hollow head of the body, and wherein the clamping member is arranged to fit in the guide channel and wherein the clamping member has a threaded aperture for engaging with the threaded region of the screw member, such that rotation of the screw member causes the clamping member to move along the guide channel of the body, and wherein the clamping member has an urging portion and a clamping portion, arranged such that the urging portion of the clamping member can fit within the urge channel of the body and further arranged such that when the urging portion of the clamping member is located within the urge channel of the body the clamping member is concealed within the boundary of the outer surface of the body in a retracted position and when the urging portion is not located in the urge channel of the body the clamping portion of the clamping member extends from the outer surface of the body in a clamping position.

A retaining member may be provided in the head of the body, such as a circlip, to retain the screw member within the body.

There may be a clearance between the head of the screw member and the space defined by the circlip and the internal end face of the head of the body within which the screw member is free to move and thus allow the thread of the screw member radial movement within the shaft.

The guide channel may terminate before the distal end of the shaft and the threaded region of the screw member may be longer than the shaft so that the radial movement of the screw member within the shaft is restricted to within the internal diameter of the shaft.

The clamping member may have a securing feature at its distal end for engaging with the termination of the guide channel to prevent radial movement of the clamping member and retain it in the retracted position. The fastening feature may be a sloping face or a notch in the rear face.

The screw member may have a hexagonal recess for turning it with a tool.

The head of the body may be countersunk.

The external surface of the head of the body may have flat faces for receiving an anti-rotation tool.

The clamping member may have an unthreaded recess providing a free-spin feature.

In an embodiment, a method of clamping components using the fastener described above may be provided, comprising the steps of ensuring that the clamping member is set in the retracted position, inserting the fastener into an aperture within the components, using a tool to rotate the screw member in a clamping direction such that the clamping member moves out of the retracted position into the clamping position and along the guide channel until the clamping region of the clamping member contacts the underside of the components, further rotating the screw member to apply a force between the head of the body and the clamping member to the components, this clamping them together.

The method may further comprise the step of rotating the screw member in the opposite direction to release the clamping member, and further rotating the screw member until the clamping member is located within the urge channel in the retracted position and then removing the fastener from the components.

BRIEF DESCRIPTION OF THE DRAWINGS

FIG. 3a is a cross sectional view of the body of the embodiment of the invention shown in FIG. 2a.

FIG. 3d is a view of the proximal end of the embodiment of the invention shown in FIG. 2a.

FIG. 3e is a view of the distal end of the embodiment of the invention shown in FIG. 2a.

FIG. 4 is a side view of the screw member of the embodiment of the invention shown in FIG. 2a.

DETAILED DESCRIPTION OF THE PREFERRED EMBODIMENT

Figure 1:
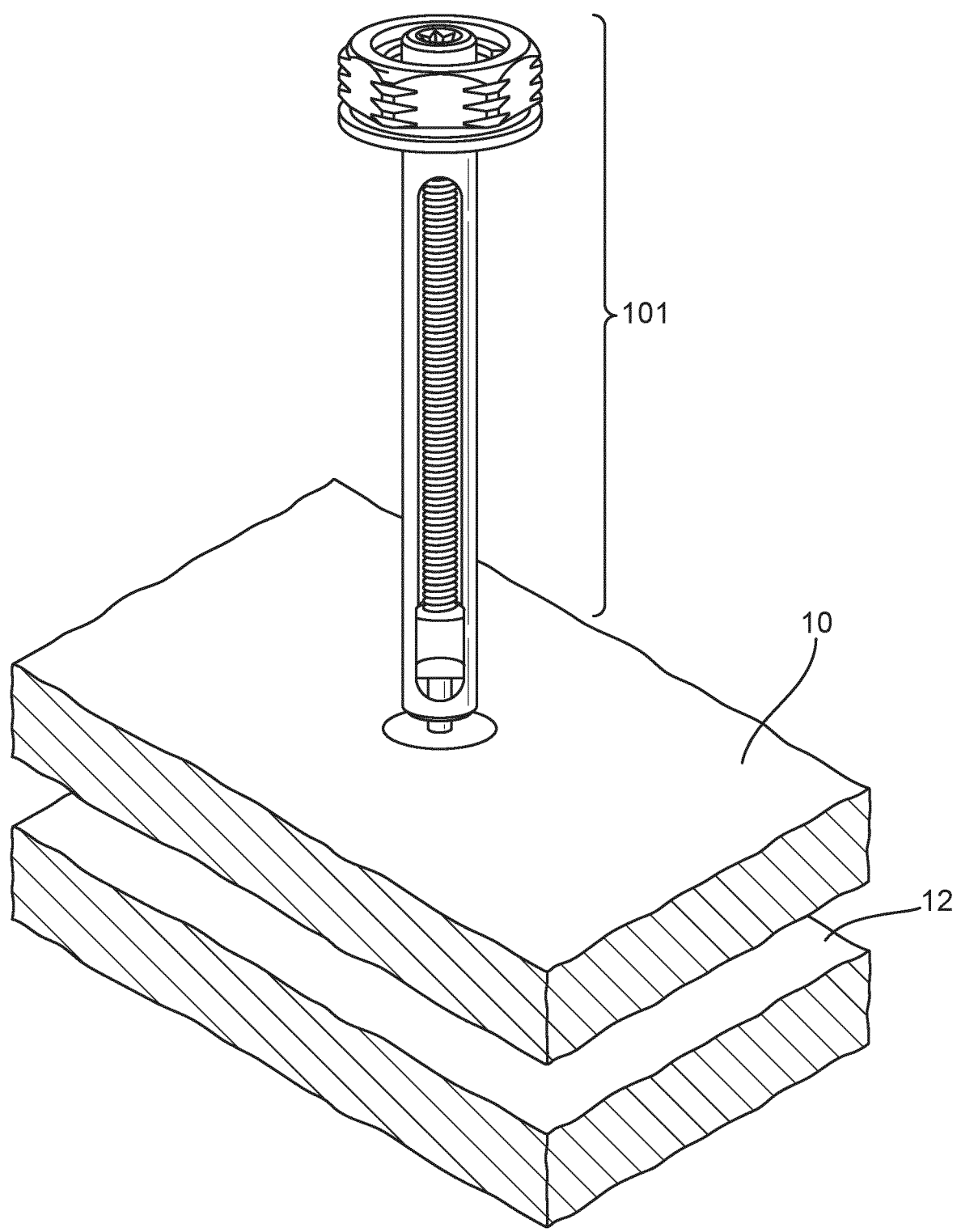
FIG. 1 is a perspective view of an embodiment of the invention prior to insertion in apertures in components to be clamped together.

With reference to FIG. 1, the present invention is a removable blind fastener 101 for use in clamping two or more components together. The components are typically sheet materials, such as 10 and 12. The fastener is intended to temporarily clamp components together and is therefore easy to install and remove. It is arranged to fit within apertures having a very narrow bore, for example 3 mm.

Figure 2A:
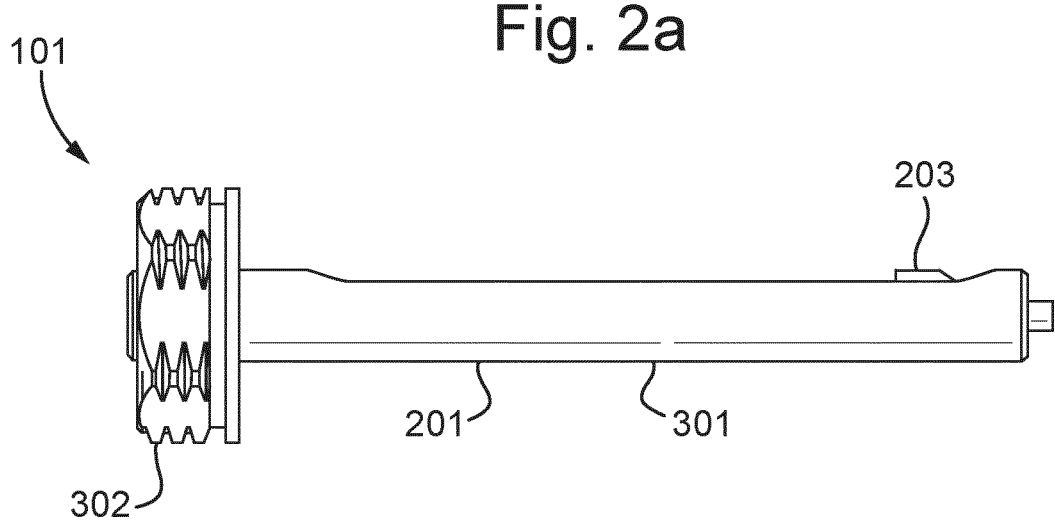
FIG. 2a is a side view of an embodiment of the invention.
Figure 2B:
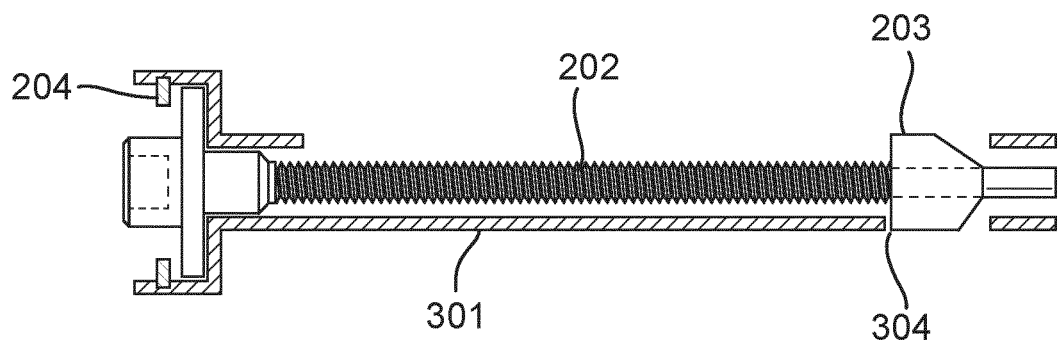
FIG. 2b is a cross-sectional view of the embodiment shown in FIG. 2a where a clamping member is in an insertion position.

The removable blind fastener has three major parts as shown in FIGS. 2a and 2b; i) a body 201; ii) an elongate screw member 202 and iii) a clamping member 203.

Figure 3A:
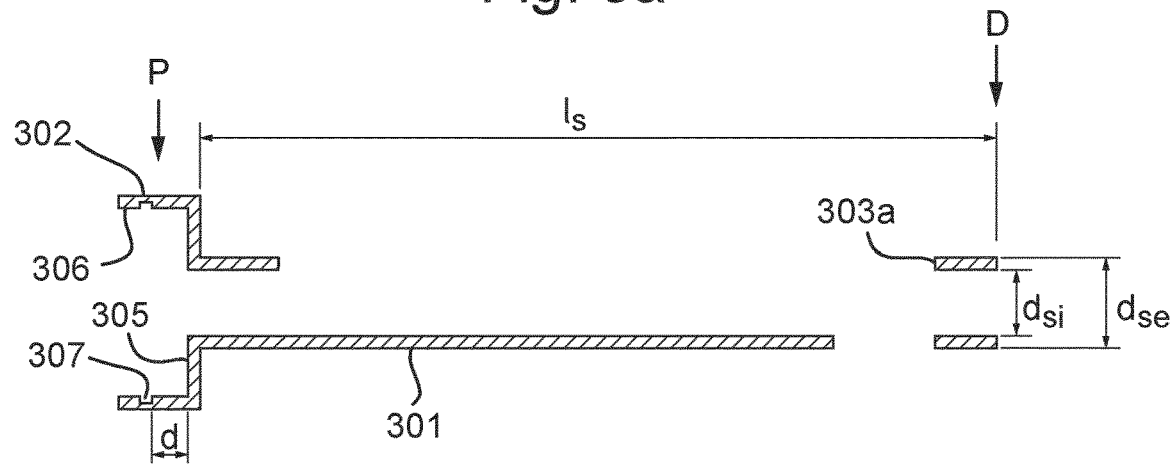

The body is shown in cross section in FIG. 3a. It has two major regions; a shaft 301 and a head 302.

Figure 3B:
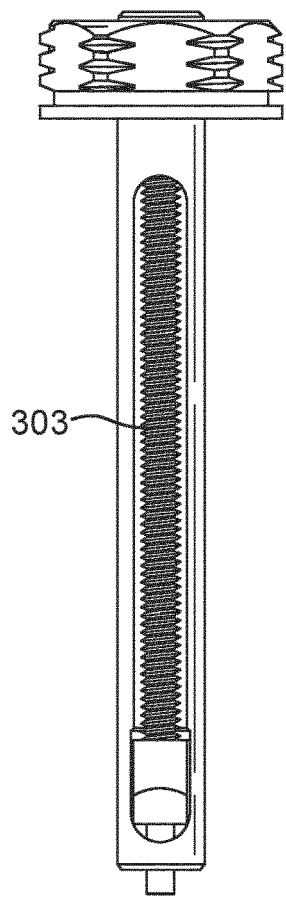
FIG. 3b is a side view of an embodiment of the invention showing a slot.
Figure 3C:
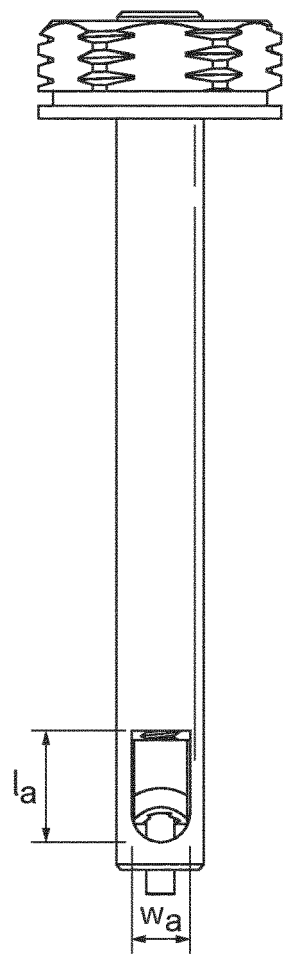
FIG. 3c is a side view of an embodiment of the invention showing an aperture.

The shaft 301 comprises a hollow tube of length "$l_s$" having a slot 303 running substantially the entire length of the shaft 301, as shown in FIG. 3b. The shaft also includes an aperture 304 at a distal end D, as shown in FIG. 3c. The aperture is of length "$l_a$" and width "$w_a$". The distal end of the slot and the distal and proximal ends of the aperture are rounded. The distal end of the slot and the distal end of the aperture are coterminous as shown in FIG. 3a. The distal end D of the shaft 301 is open. FIG. 3e shows the open distal end D of the fastener where the wall thickness "t" of the shaft can be seen. The shaft has an internal diameter "$d_{si}$" and an external diameter "$d_{se}$" as shown in FIG. 3a.

The head 302 is located at a proximal end P of the shaft 301 and flares perpendicularly outward from the shaft. In an alternative embodiment, the head may flare outward at an angle to provide a countersunk head. The head 302 is recessed having an internal end face 305 and cylindrical internal side walls 306, as shown in FIG. 3a. The side walls 306 include a channel 307 for receiving a circlip. There is a defined distance "d" between the channel 307 and the internal end face 305. The exterior surface of the head has tool engagement faces 308 as shown in FIG. 3d constituting a hex head for holding the body of the fastener 101 while it is tightened and loosened.

The elongate screw member 202 is shown in FIG. 4. It comprises a threaded region 401 and a head region 402.

The threaded region is of a length "$l_t$" which is greater than the length of the shaft "$l_s$". The threaded region carries an external thread for substantially all of its length, apart from at the distal end D that has a smooth part 404. The threaded region 401 has a diameter "$d_t$", which is less than the internal diameter "$d_{si}$" of the shaft 301. FIG. 3e shows the relationship between the distal end of the screw member 405 and the shaft 301, where a clearance $d_{si}$-$d_t$ between the two components can be seen.

The screw member has a head 402 at a proximal end P, comprising a thin disc 403 and a thick cylinder 406. The disc 403 is of a diameter substantially equal to the diameter of the internal recess of the head. The thickness of the disc "$t_d$" is less than the distance "d" between the channel 307 and the internal end face 305 of the head of the body. The cylinder 406 includes a hexagonally profiled recess 407 at the proximal end for receiving a tool to turn the screw member 202.

Figure 5A:
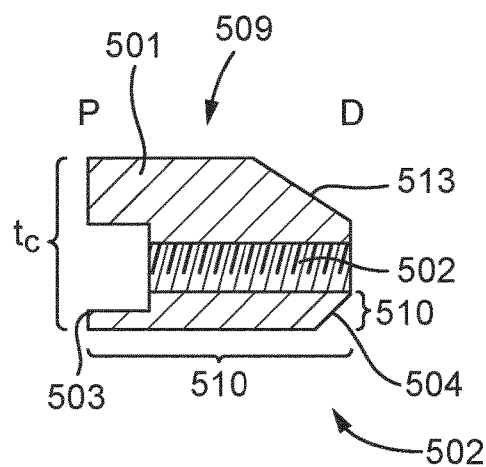
FIG. 5a is a cross sectional view through the clamping member of an embodiment of the invention.
Figure 5B:
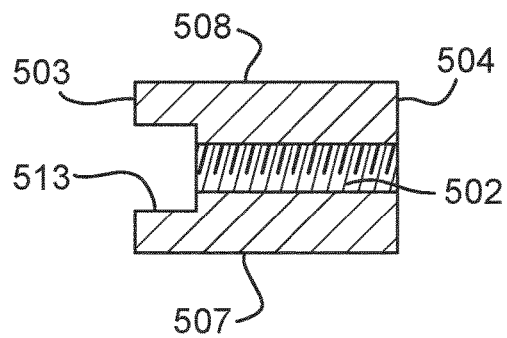
FIG. 5b is an end view of the clamping member of an embodiment of the invention.
Figure 5C:
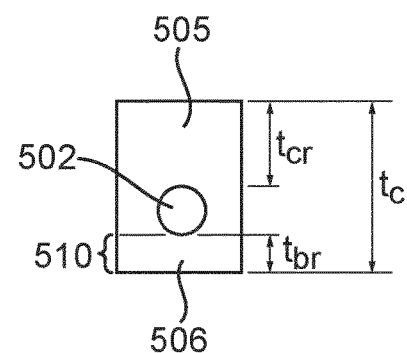
FIG. 5c is another cross sectional view of the clamping member of an embodiment of the invention.
Figure 5D:
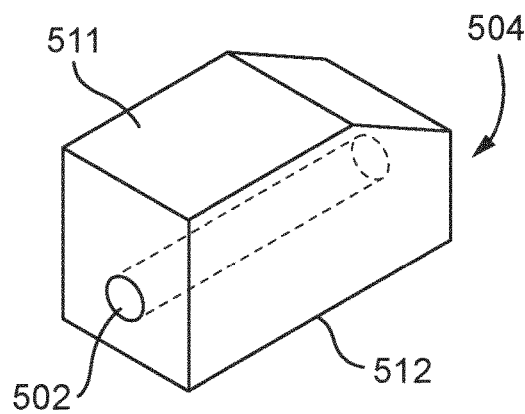
FIG. 5d is a perspective view of the clamping member of an embodiment of the invention.

The clamping member 203 is shown in more detail in FIGS. 5a to 5d. It comprises a solid body 501 with an internally threaded aperture 502 running from a front face 503 at a proximal end, P, to a sloping rear face 504 at a distal end, D. The threaded aperture is arranged to engage with the threaded region 401 of the screw member 202. The front face 503 has two regions; a clamping face 505 as shown in FIG. 5c and a biasing face 506. The clamping member 501 also has longitudinal sides 507, 508 running parallel to the threaded aperture 502. The sides 507, 508 and clamping face 505 define a clamping region 509 on one side of the threaded aperture, of thickness "$t_{cr}$". The clamping region 509 has an outer face 511, parallel to the threaded aperture 502 and perpendicular to both the clamping face and sides 507, 508. The sides 507, 508 and biasing face 506 define a biasing region 510 on the other side of the threaded aperture, of thickness "$t_{br}$". The biasing region 510, also referred to as an urging portion 510, has an outer face 512, parallel to the threaded aperture 502 and perpendicular to both the biasing face and sides 507, 508. The biasing region 510 is arranged to fit within the aperture 304, also referred to as an urge channel 304, of the fastener body 201. The thickness of the clamping member "$t_c$" is substantially equal to the external diameter of the shaft "$d_{se}$" and the thickness of the biasing region "$t_{br}$" is substantially equal to the thickness "t" of the shaft wall, so that when the biasing region 510 of the clamping member 203 is located within the aperture 304 of the fastener body 201, both the clamping region outer face 511 and biasing region outer face 512 are flush with the outside of the shaft 301 of the fastener body 201. A free spin region 513 is provided at the proximal end of the clamping member, which allows the screw member to rotate freely without moving the clamping member to prevent mechanical damage when the fastener is being removed by a power tool.

Figure 2C:
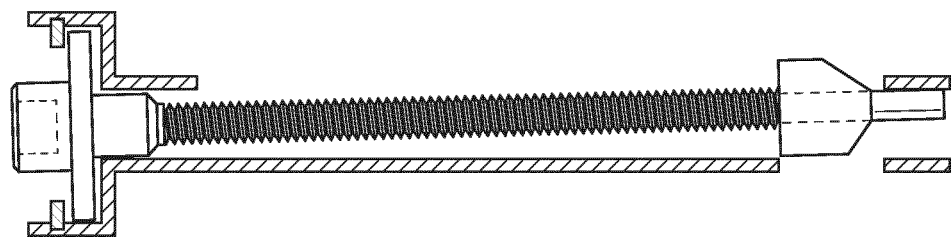
FIG. 2c is a cross-sectional view of the embodiment shown in FIG. 2a where a clamping member is exposed in a clamping position.

The fastener 101 is assembled as follows:

The clamping member 501 is located in the slot 303 of the fastener body 201 in the region of the aperture 304. The screw member 202 is inserted into the hollow centre of the fastener body 201 until the end 405 of the threaded region of the screw member 202 meets the clamping member 501; the screw member is rotated so that the threaded region 401 engages with the threaded aperture 502 of the clamping member 501. The screw member is continually rotated until the smooth end 404 protrudes from the end of the clamping member 501. The screw member is then fully inserted into the body 201 so that disc 403 of the screw member abuts the internal end face 305 of the body 201 and the smooth end 404 of the screw member protrudes from the end of the body 201. A circlip 204 is then inserted into the channel 307 of the head of the body 201 to retain the screw member 202 in place. The clearance between i) the circlip 204 and the internal end face 305 of the body 201 of the fastener and ii) between the screw member and the internal surface of the shaft, allows the screw member 202 to pivot about the edge of the disc such that the threaded part of the screw member can move laterally within the shaft i.e. across the direction of the axis of the shaft; as well as longitudinally, i.e. in the direction of the axis of the shaft. This freedom of movement of the screw member allows the clamping member to move between two positions; a first "insertion position" as described above and shown in FIG. 2b, where it is flush with the outside of the shaft and a second "clamping position" as shown in FIG. 2c, where the clamping face extends beyond the outside of the shaft.

The insertion position is characterised by the clamping member 203 being positioned along the screw member 202 such that it is located within the aperture 304 of the shaft 301 and the two outer faces of the clamping member 203 are substantially flush with the external surface of the shaft. The insertion position is set prior to the fastener's use, as this position allows it to be inserted into pre-drilled apertures of components being clamped.

In use, the fastener is set in the insertion position, where the clamping member is aligned with the aperture in the shaft. The fastener 101 is inserted into the pre-drilled holes in the aperture so that the head 302 of the body 301 of the fastener abuts the top surface of the material being clamped. A tool is inserted into the recess 407 in the head 302 of the screw member 202. Another tool is used to grip the faces 308 to prevent the fastener from rotating. The tool may be a hand operated device such as an alien key or a machine operated device, such as an electrically powered nut runner. When the tool is turned in a clockwise direction the screw member 202 turns. The clamping member 203 is prevented from also turning by the reaction of the side 507 of the clamping member 203 against the side of the slot 303 in the body 301 of the fastener and therefore is caused to move towards the proximal end P of the fastener along the thread 401 of the screw member 202. As the tool continues to turn the screw member the clamping member moves along the thread, the biasing face 506 of the clamping member contacts the rounded end of the aperture 304 and the clamping member is gradually urged out of the aperture and thus the clamping face 505 rises out of the slot to extend from the outer surface of the shaft 301 of the fastener, as shown in FIG. 2c. As the tool continues to turn, the clamping member moves along the thread towards the proximal end of the fastener with the clamping face proud of extending from the outer surface of the shaft as the biasing region outer face 512 bears against the inner surface of the shaft. As the tool continues to turn, the clamping member draws toward the under surface of the component being clamped and the clamping face 505 contacts it and further turning of the screw member applies a clamping force between the head and the clamping face to the components being clamped.

To release the fastener, the tool is used to turn the screw in an anti-clockwise direction which causes the clamping member to move towards the distal end of the shaft along the slot. When the clamping member returns to the distal end of the slot, the retraction face 513 of the clamping member 203 engages with the end of the slot 303a and urges the clamping member back to locate into the aperture 304 so that the clamping member is retracted into the body of the fastener and the external faces of the clamping member are then flush with the outer surfaces of the shaft so that the fastener can be removed from the apertures in the work-pieces. Continued rotation of the screw member causes the thread of the screw member to disengage from the thread of the clamping member so that the screw member can rotate freely without damaging the fastener.

The fastener components may be made of steel, either 3D printed or machined. The body of the fastener may also be made of plastic.

Typical ranges for dimensions are anything from 2 mm (preferred) in diameter to 25 mm for the shaft. The length of the shaft can be from 2 mm to 150 mm or more.

The advantage of this type of fastener is that the clamping part is located within the shaft of the body and therefore the external dimensions of the fastener may be kept very small, allowing clamping of components with very small apertures of the order of 2-5 mm.

The invention claimed is:

1. A removable blind fastener comprising:
   a body, a screw member, and a clamping member,
   wherein the body comprises a hollow cylindrical shaft having a proximal end and a distal end and a head at the proximal end, the head being hollow with an internal end face,
   wherein the shaft has an open guide channel along a portion of the shaft's length and an urge channel opposite the guide channel,
   wherein the urge channel is located at the distal end of the shaft,
   wherein the screw member has a threaded region that fits within the shaft of the body and wherein the screw member has a head at a proximal end that fits within the hollow head of the body, and
   wherein the clamping member is arranged to fit in the guide channel and wherein the clamping member has a threaded aperture for engaging with the threaded region of the screw member, such that rotation of the screw member causes the clamping member to move along the guide channel of the body, and wherein the clamping member has an urging portion and a clamping portion, arranged such that the urging portion of the clamping member can fit within the urge channel of the body and further arranged such that when the urging portion of the clamping member is located within the urge channel of the body the clamping member is concealed within the boundary of the outer surface of the body in a retracted position and when the urging portion is not located in the urge channel of the body the clamping portion of the clamping member extends from the outer surface of the body in a clamping position;
   wherein the screw member is free to move radially within the shaft and wherein the guide channel terminates before the distal end of the shaft and the threaded region of the screw member is longer than the shaft so that radial movement of the screw member within the shaft is restricted to within the internal diameter of the shaft.

2. The fastener of claim 1, wherein the head of the body has a circlip to prevent removal of the screw member from the fastener.

3. The fastener of claim 2, wherein there is a clearance between the head of the screw member and the space defined by the circlip and the internal end face of the head of the body within which the screw member is free to move and thus allow the thread of the screw member radial movement within the shaft.

4. The fastener of claim 1, wherein the clamping member has a securing feature at the clamping member's distal end for engaging with the termination of the guide channel to prevent radial movement of the clamping member and retain the clamping member in the retracted position.

5. The fastener of claim 4, wherein the securing feature is a sloping face or a notch in the clamping member rear face.

6. The fastener of claim 1, wherein the head of the screw member has a hexagonal recess.

7. The fastener of claim 1, wherein the head of the body is countersunk.

8. The fastener of claim 1, wherein the external surface of the head of the body has flat faces for receiving an anti-rotation tool.

9. The fastener of claim 1, wherein the clamping member has an unthreaded recess providing a free-spin feature.

10. A method of clamping components using the fastener of claim 1, comprising the steps of: ensuring that the clamping member is set in the retracted position, inserting the fastener into an aperture within the components, using a tool to rotate the screw member in a clamping direction such that the clamping member moves out of the retracted position into the clamping position and along the guide channel until the clamping region of the clamping member contacts the underside of the components, further rotating the screw member to apply a force between the head of the body and the clamping member to the components, this clamping the clamping member and the components together.

11. The method of claim 10, further comprising the step of rotating the screw member in the opposite direction to release the clamping member, and further rotating the screw member until the clamping member is located within the urge channel in the retracted position and then removing the fastener from the components.

\* \* \* \* \*